US012770414B2

(12) United States Patent
Wang et al.

(10) Patent No.: US 12,770,414 B2
(45) Date of Patent: Oct. 20, 2026

(54) DYEING EFFECT PREDICTION METHOD, TRAINING METHOD OF DYEING EFFECT PREDICTION MODEL, ELECTRONIC DEVICE AND STORAGE MEDIUM

(71) Applicant: ZHEJIANG HENGYI PETROCHEMICAL CO., LTD., Hangzhou (CN)

(72) Inventors: Peng Wang, Hangzhou (CN); Xiantao Peng, Hangzhou (CN); Mingyi Liu, Hangzhou (CN); Dandan Wang, Hangzhou (CN); Jun Shen, Hangzhou (CN); Zheng Teng, Hangzhou (CN)

(73) Assignee: ZHEJIANG HENGYI PETROCHEMICAL CO., LTD., Hangzhou (CN)

( * ) Notice: Subject to any disclaimer, the term of this patent is extended or adjusted under 35 U.S.C. 154(b) by 232 days.

(21) Appl. No.: 18/748,122

(22) Filed: Jun. 20, 2024

(65) Prior Publication Data

US 2025/0061731 A1 Feb. 20, 2025

Related U.S. Application Data

(63) Continuation of application No. 18/424,915, filed on Jan. 29, 2024, now abandoned, which is a
(Continued)

(30) Foreign Application Priority Data

Aug. 17, 2023 (CN) ........................ 202311034920.0

(51) Int. Cl.
*G06T 7/00* (2017.01)
*G06V 10/774* (2022.01)
(Continued)

(52) U.S. Cl.
CPC .......... *G06V 20/695* (2022.01); *G06T 7/0004* (2013.01); *G06V 10/774* (2022.01);
(Continued)

(58) Field of Classification Search
None
See application file for complete search history.

(56) References Cited

U.S. PATENT DOCUMENTS

| | | | | |
|---|---|---|---|---|
| 6,423,262 | B1 | 7/2002 | Van Wijk et al. | |
| 12,026,963 | B1 * | 7/2024 | Wang | G06V 10/82 |
| 2023/0133055 | A1 | 5/2023 | Tang et al. | |

FOREIGN PATENT DOCUMENTS

| | | | |
|---|---|---|---|
| CN | 104142322 | A | 11/2014 |
| CN | 111566266 | A | 8/2020 |

(Continued)

OTHER PUBLICATIONS

Eyupoglu, Can, Seyda Eyupoblu, and Nigar Merdan. "Natural dyeing of air plasma-treated wool fabric with Rubia tinctorum L. and prediction of dyeing properties using an artificial neural network." (2023). (Year: 2023).*

(Continued)

*Primary Examiner* — Sean M Conner
(74) *Attorney, Agent, or Firm* — Gearhart Law LLC

(57) ABSTRACT

Provided is a dyeing effect prediction method, a training method of a dyeing effect prediction model, an electronic device, and a storage medium, relating to the field of computers, and in particular to artificial intelligence technologies, neural network model technologies and model training technologies. The dyeing effect prediction method includes decomposing Raman spectrum data of a to-be-detected yarn spindle into a plurality of sub-signal data by using a wavelet basis function; determining a feature of the to-be-detected yarn spindle according to at least a part of
(Continued)

target sub-signal data in the plurality of sub-signal data; and predicting to obtain a first dyeing label according to the feature of the to-be-detected yarn spindle by using a dyeing effect prediction model, wherein the first dyeing label is used for representing a dyeing effect grade.

12 Claims, 5 Drawing Sheets

Related U.S. Application Data continuation of application No. 18/530,287, filed on Dec. 6, 2023, now Pat. No. 12,026,963.

(51) Int. Cl.
*G06V 10/776* (2022.01)
*G06V 10/80* (2022.01)
*G06V 20/69* (2022.01)
*G06V 20/70* (2022.01)

(52) U.S. Cl.
CPC ............ *G06V 10/776* (2022.01); *G06V 10/80* (2022.01); *G06V 20/70* (2022.01); *G06T 2207/10056* (2013.01); *G06T 2207/20064* (2013.01); *G06T 2207/20081* (2013.01); *G06T 2207/30124* (2013.01)

(56) References Cited

FOREIGN PATENT DOCUMENTS

| | | | | |
|---|---|---|---|---|
| CN | 112285092 A | | 1/2021 | |
| CN | 112649391 A | | 4/2021 | |
| CN | 113933284 A | | 1/2022 | |
| CN | 114092935 A | | 2/2022 | |
| CN | 114595752 A | * | 6/2022 | ......... G06F 18/2415 |
| CN | 114945954 A | | 8/2022 | |
| CN | 115015120 A | | 9/2022 | |
| TW | 392070 B | | 6/2000 | |
| WO | 2012087138 A1 | | 6/2012 | |
| WO | 2019096178 A1 | | 5/2019 | |

OTHER PUBLICATIONS

Office action received in JP Application No. 2023-199544, Dated Dec. 13, 2023, pp. 8.
First office action received in CN Application No. 202311034920.0, Dated Sep. 28, 2023, pp. 8.
Notification on Grant of the Patent received in CN Application No. 202311034920.0, Dated Oct. 25, 2023, pp. 5.
Guo, et al., "Multi-component quantitative analysis method for dyeing with reactive dyes", Journal of textile research, 2023, vol. 44, No. 7, pp. 141-150.
Lu Hui., "Study on dyeing process of nylon with acid dyes based on raman spectroscopy", School of chemistry, chemical engineering and biological engineering, Dated May 25, 2021, pp. 63.
Liu et al., "NIRS feature extraction based on deep auto-encoder neural network", Infrared physics & technology, 2017, vol. 87 pp. 124-128.
Wang, et al. "Identification for Disperse Dyes on Single Fiber by SERS." Key Engineering Materials 2020, vol. 845 pp. 109-114 (English Abstract Only).
Zhou, et al. "A deep learning method for predicting lead content in oilseed rape leaves using fluorescence hyperspectral imaging", Food Chemistry, vol. 409 Dated May 30, 2023, pp. 5.
Zhao, et al. "ConlnceDeep: A novel deep learning method for component identification of mixture based on Raman spectroscopy." Chemometrics and Intelligent Laboratory Systems, vol. 234 Dated Mar. 15, 2023, pp. 12.
Chen, Liqing, et al. "Multi-modal feature fusion based on variational autoencoder for visual question answering." Chinese Conference on Pattern Recognition and Computer Vision (PRCV). Cham: Springer International Publishing, 2019. (Year: 2019).
Si, L. I. U. Multi-modal Deep Learning. Diss. Worcester Polytechnic Institute, 2022. (Year: 2022).

* cited by examiner

DYEING EFFECT PREDICTION METHOD, TRAINING METHOD OF DYEING EFFECT PREDICTION MODEL, ELECTRONIC DEVICE AND STORAGE MEDIUM

CROSS-REFERENCE TO RELATED APPLICATIONS

The present application is a Continuation Application of U.S. application Ser. No. 18/424,915 filed Jan. 29, 2024 which is a Continuation Application of U.S. application Ser. No. 18/530,287 filed Dec. 6, 2023, which claims priority to Chinese Patent Application No. CN202311034920.0, filed with the China National Intellectual Property Administration on Aug. 17, 2023, the disclosure of which is hereby incorporated herein by reference in its entirety.

TECHNICAL FIELD

The present disclosure relates to a field of computers, and in particular, to artificial intelligence technologies, neural network model technologies, and model training technologies.

BACKGROUND

In the production of chemical fibers, it is difficult to ensure the processing parameters of multiple production devices are completely consistent, and the processing parameters may be different when the same device is used in the production for different batches, resulting in that the coloring effect of the chemical fiber yarn spindle may be changed therewith in the process of the subsequent dyeing so as to be difficult to accurately predict. Currently, in order to determine the dyeing effect of different batches of yarn spindles, a method is adopted in which a part of each batch of yarn spindles is extracted as a sample to be dyed after being woven into a garter, and then the dyeing effect is manually recognized and divided into a plurality of grades.

SUMMARY

The present disclosure provides a dyeing effect prediction method, a training method and apparatus of a dyeing effect prediction model, a device and a storage medium, so as to solve or alleviate one or more technical problems in the related arts.

According to a first aspect, provided in the present disclosure is a dyeing effect prediction method, including:

- decomposing Raman spectrum data of a to-be-detected yarn spindle into a plurality of sub-signal data by using a wavelet basis function;
- determining a feature of the to-be-detected yarn spindle according to at least a part of target sub-signal data in the plurality of sub-signal data; and
- predicting to obtain a first dyeing label according to the feature of the to-be-detected yarn spindle by using a dyeing effect prediction model, wherein the first dyeing label is used for representing a dyeing effect grade.

According to a second aspect, provided in the present disclosure is a training method of a dyeing effect prediction model, including:

- decomposing Raman spectrum data of a specimen yarn spindle into a plurality of sub-signal data by using a wavelet basis function;
- determining a feature of the specimen yarn spindle according to at least a part of sub-signal data in the plurality of sub-signal data;
- predicting to obtain a second dyeing label according to the feature of the specimen yarn spindle by using a first prediction model;
- obtaining a loss function according to a real dyeing label of the specimen yarn spindle and the second dyeing label; and
- updating a parameter of the first prediction model according to the loss function to obtain a trained dyeing effect prediction model.

According to a third aspect, provided is a dyeing effect prediction apparatus, including:

- a first transform module configured to decompose Raman spectrum data of a to-be-detected yarn spindle into a plurality of sub-signal data by using a wavelet basis function;
- a first determination module configured to determine a feature of the to-be-detected yarn spindle according to at least a part of target sub-signal data in the plurality of sub-signal data; and
- a first prediction module configured to predict to obtain a first dyeing label according to the feature of the to-be-detected yarn spindle by using a dyeing effect prediction model, wherein the first dyeing label is used for representing a dyeing effect grade.

According to a fourth aspect, provided is a training apparatus of a dyeing effect prediction model, including:

- a second transform module configured to decompose Raman spectrum data of a specimen yarn spindle into a plurality of sub-signal data by using a wavelet basis function, wherein the specimen yarn spindle is a polyester fiber product having a crystalline structure;
- a second determination module configured to determine a feature of the specimen yarn spindle according to at least a part of sub-signal data in the plurality of sub-signal data;
- a second prediction module configured to predict to obtain a second dyeing label according to the feature of the specimen yarn spindle by using a first prediction model;
- a loss determination module configured to obtain a loss function according to a real dyeing label of the specimen yarn spindle and the second dyeing label; and
- an update module configured to update a parameter of the first prediction model according to the loss function to obtain a trained dyeing effect prediction model.

According to a fifth aspect, provided is an electronic device, including:

- at least one processor; and a memory connected in communication with the at least one processor, wherein
- the memory stores an instruction executable by the at least one processor, and the instruction, when executed by the at least one processor, enables the at least one processor to execute the method of any embodiment of the present disclosure.

According to a sixth aspect, provided is a non-transitory computer-readable storage medium storing a computer instruction thereon, wherein the computer instruction is used to cause a computer to execute the method of any embodiment of the present disclosure.

The beneficial effect of the technical scheme according to the present disclosure at least includes that: the dyeing grades of each batch of the yarn spindles can be detected without dyeing, and the detection precision and the detection efficiency are improved.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the drawings, like reference characters designate like or similar parts or elements throughout the accompanying figures unless otherwise specified. The figures are not necessarily drawn to scale. It should be understood that these figures depict only some of the embodiments in accordance with the disclosure and are not to be considered limiting of the scope thereof.

DETAILED DESCRIPTION

Figure 1:
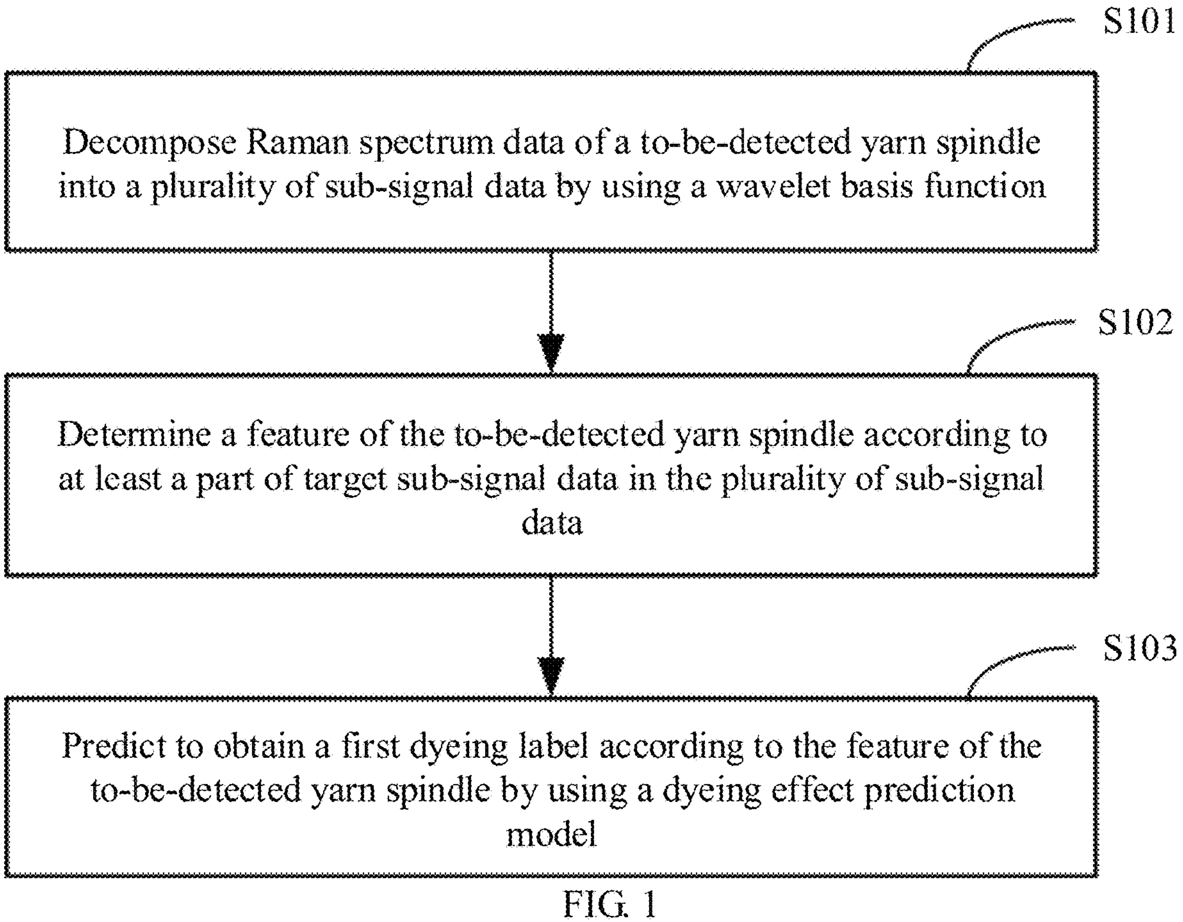
FIG. 1 shows a flow chart diagram of a dyeing effect prediction method according to an embodiment of the present disclosure.

The present disclosure will be further described in detail below with reference to the accompanying figures. In the figures, like reference numerals indicate functionally identical or similar elements. While various aspects of the embodiments are presented in the figures, the figures are not necessarily drawn to scale unless specifically indicated.

In addition, in order to better explain the present disclosure, numerous specific details will be given in the following specific implementations. Those having ordinary skill in the art should be understood that the present disclosure may be performed without certain specific details. In some examples, methods, means, elements and circuits well known to those having ordinary skill in the art are not described in detail, in order to highlight the subject matter of the present disclosure.

As described in the background, the detection method for manually recognizing the dyeing grade needs to perform the weaving and dyeing on the chemical fiber yarn spindle in a manner of sampling inspection. On one hand, there exist problems of long time consuming, low efficiency and missed detection of dyeing abnormal products. On the other hand, the accuracy of the manual color recognition result is influenced by the experience of the detector and is lower. In the meanwhile, the manual color recognition result is greatly influenced by the subjectivity of the detector and has unreliable objectivity.

In order to at least partially solve one or more of the above problems and further potential problems, embodiments of the present disclosure provide a dyeing effect prediction method, which can objectively predict the dyeing grade of each batch of yarn spindles without dyeing, thereby improving the detection accuracy and the detection efficiency.

FIG. 1 shows a dyeing effect prediction method according to an embodiment of the present disclosure. As shown in FIG. 1, the method includes at least the following steps.

S101, decomposing Raman spectrum data of a to-be-detected yarn spindle into a plurality of sub-signal data by using a wavelet basis function.

In the embodiment of the disclosure, Raman spectrum data of each measurement point can be obtained by detecting one or more measurement points on the to-be-detected yarn spindle by using a Raman spectrometer. The measurement points can be selected on a rounded side surface of the to-be-detected yarn spindle. For example, in the process of transferring the to-be-detected yarn spindle on the production line, 3 to 6 measurement points are selected on a rounded side surface at an upward side of the to-be-detected yarn spindle. The to-be-detected yarn spindle can be lifted through a lifting device to select 2-5 measurement points on upper and lower rounded side surfaces, respectively, so as to improve the accuracy of a measurement result. The number of the measurement points is not limited thereto and can be adjusted according to actual conditions.

The to-be-detected yarn spindle can be a polyester fiber product with a crystalline structure or an amorphous structure. The polyester fiber product can be polyester filament yarn obtained by spinning and post-treatment. The crystalline structure refers to a state in which polymers are orderly arranged in the fiber. In the crystalline structure, the polymer chains are closely arranged to form an ordered lattice structure. The fiber with the crystalline structure generally has a high crystallinity, and shows sharp diffraction peaks for example in X-ray diffraction experiments. Due to the ordered arrangement of the molecules, the fibers of crystalline structure are generally more stable, while also having higher strength and stiffness. The amorphous structure means that the polymer is in a disordered state in the fiber and does not form a regular lattice structure. In the amorphous structure, the polymer chains are relatively loose and have no obvious periodic arrangement. The fiber with the amorphous structure generally has a lower crystallinity. In dyeing, the crystal lattice structure is generally not colored, and therefore, a crystallinity degree, a crystal distribution, and an orientation degree of the crystal have a certain correlation with the dyeing effect.

Wavelet transform is a signal processing technique that can decompose a signal into sub-signals of different frequency ranges to obtain local characteristics of the signal. In dye effect prediction, frequency domain features in the Raman spectrum data can be effectively captured using the wavelet transform.

In one example, the flow of the wavelet transform includes: preprocessing the captured Raman spectrum data, including peak correction, baseline correction, spectrum smoothing, noise reduction and other operations, so as to reduce the influence of noise on a wavelet transform result; applying the wavelet transform to the preprocessed Raman spectrum data; and decomposing spectrum data into sub-signals of different dimension and frequency ranges by selecting appropriate wavelet basis functions. Any one of the following wavelet basis functions may be used:

Haar wavelet: which is the simplest wavelet basis function for discrete wavelet transforms, and which is a simple square wave function with balanced frequency and time domain localization.

Morlet wavelet: which is used for continuous wavelet transform, and which is complex-form wavelet basis function for analyzing signals in time-frequency domain.

Daubechies wavelet: which is commonly used in discrete wavelet transforms, and which is a family of orthogonal wavelet basis functions. Different Daubechies wavelet basis functions have different dimension and frequency characteristics.

Symlet wavelet: which is a symmetric version of the Daubechies wavelet and which is also commonly used in discrete wavelet transforms.

S102, determining a feature of the to-be-detected yarn spindle according to at least a part of target sub-signal data in the plurality of sub-signal data.

The plurality of sub-signal data obtained through wavelet transforms are screened to obtain more representative target sub-signal data. Feature extraction is performed on the target sub-signal data to obtain the feature of the to-be-detected yarn spindle. The feature extraction may consider using statistical features (e.g., mean, variance and kurtosis), frequency domain features (e.g., energy distribution and spectral morphology), or other relevant features.

S103, predicting to obtain a first dyeing label according to the feature of the to-be-detected yarn spindle by using a dyeing effect prediction model, wherein the first dyeing label is used for representing a dyeing effect grade.

The dyeing effect prediction model can be a deep learning model obtained by pre-training, and the deep learning model can adopt a Convolutional Neural Network (CNN) or a Recurrent Neural Network (RNN). The model is trained using labeled sample Raman spectrum data. The deep learning model automatically learns high-level feature representation of sample data and forms a feature learner suitable for dyeing grade prediction.

According to the scheme of the embodiment of the disclosure, online detection in a production scene can be realized by adopting Raman spectrum data to detect the dyeing effect of the yarn spindle in real time, such that production equipment and production process parameters can be fed back and adjusted in time based on the detection result; by learning the feature information of the polymer fibers with the crystalline structure and the amorphous structure through the dyeing effect prediction model, the model can predict the dyeing effects of the two types of polyester fibers; the wavelet transform feature extraction method based on the Raman spectrum data can capture signal changes in different dimension and frequency ranges, and therefore richer and more accurate feature information can be extracted efficiently.

In a possible implementation, step S102 of determining the feature of the to-be-detected yarn spindle according to at least the part of target sub-signal data in the plurality of sub-signal data, further includes the following steps.

S1021, selecting at least the part of target sub-signal data from the plurality of sub-signal data according to a preset dimension or a preset frequency to obtain first Raman data, wherein the plurality of sub-signal data correspond to a plurality of wavelet coefficients with different dimensions or a plurality of spectrum components with different frequencies; and

S1022, determining the feature of the to-be-detected yarn spindle according to the first Raman data.

In the embodiment of the present disclosure, on one hand, the plurality of sub-signal data can be screened, so as to obtain more representative target sub-signal data. On the other hand, the Raman spectrum data of the to-be-detected yarn spindle can be subjected to multiple wavelet transform by using multiple wavelet basis functions to obtain multiple groups of sub-signal data. Then the multiple groups of sub-signal data are screened to obtain more representative target sub-signal data and the corresponding transformation dimension or transformation frequency are taken as a preset dimension or preset frequency. Different wavelet basis functions may be used for polymer fibers of crystalline and amorphous structures.

The screening of the plurality of sub-signal data may include steps of:

a. Selection of dimension range of interest: selecting a wavelet dimension range of interesting according to the characteristics of the spectrum data. The wavelet transform with different dimensions can highlight the characteristics of different frequency ranges, so that a proper dimension range is selected according to research requirements.

b. Extraction of target frequency band: extracting a sub-signal of a target frequency band in a wavelet coefficient image according to the selected dimension range. The wavelet coefficients with low amplitude can be set to zero by setting a threshold on the wavelet coefficient image, leaving the sub-signals with higher amplitude.

c. Inverse wavelet transform: performing an inverse wavelet transform on the extracted target sub-signals to convert the extracted target sub-signals back to the original spectrum data representation.

d. Visualization and comparison: visualizing the inversely transformed target sub-signal data, and comparing similarity and difference of the inversely transformed target sub-signal data with the original spectrum data. A comparison between the target sub-signal data and the original spectrum data can be plotted to visually assess the representativeness of the screened sub-signal data.

e. Selection of representative sub-signal: selecting the target sub-signal with better representativeness as a final result according to the comparison result. The target sub-signal with better representativeness should be able to retain the main features and information of the original spectrum data while removing more noise and extraneous information.

The screening process can be adjusted and optimized according to the specific production scenarios of different synthetic fiber products. Different wavelet dimension ranges or threshold settings are tried to obtain better screening results. Meanwhile, the prior knowledge about the features of the spectrum data if available can also be added into the screening process, so that the representativeness of the sub-signals is further improved. Through the screening process, more representative and information-rich target sub-signal data can be selected from the plurality of sub-signals obtained through the wavelet transform.

In an example, the Raman spectrum data of the to-be-detected yarn spindle is subjected to wavelet transform by using a first wavelet basis function to obtain first sub-signal data A, first sub-signal data B and first sub-signal data C. The Raman spectrum data of the to-be-detected yarn spindle is subjected to wavelet transform by using a second wavelet basis function to obtain second sub-signal data A, second sub-signal data B and second sub-signal data C. The plurality of sub-signal data correspond to the plurality of wavelet coefficients of different dimensions or the plurality of spectrum components of different frequencies. Then, the plurality of sub-signal data are screened to obtain target sub-signal data (e.g., the second sub-signal data A and the first sub-signal data B).

According to the scheme of the embodiment of the disclosure, signal changes in different dimensions and frequency ranges can be captured, so that richer and more accurate feature information can be extracted and more accurate and reliable results can be predicted for the dyeing effect.

In a possible implementation, the step S1022 of determining the feature of the to-be-detected yarn spindle according to the first Raman data further includes:

S110, determining the feature of the to-be-detected yarn spindle according to microscopic image data of the to-be-detected yarn spindle and the first Raman data.

In the embodiment of the disclosure, a part of structural features of the to-be-detected yarn spindle can be read through the first Raman data, and more feature information which may influence the dyeing effect can be further obtained by introducing the microscopic image data of the to-be-detected yarn spindle. The multi-modal data can fully utilize complementary information between Raman spectrum data and image data to improve the accuracy and robustness of predicting the dyeing grade.

In a possible implementation, step S110 of determining the feature of the to-be-detected yarn spindle according to the microscopic image data of the to-be-detected yarn spindle and the first Raman data further includes:

S1101, determining a target image feature according to the microscopic image data of the to-be-detected yarn spindle by using a Multi-modal Autoencoder contained in the dyeing effect prediction model;

S1102, determining a target spectrum feature according to the first Raman data by using the Multi-modal Autoencoder; and

S1103, determining the feature of the to-be-detected yarn spindle according to the target image feature and the target spectrum feature by using a feature fusion layer contained in the dyeing effect prediction model.

Figure 3:
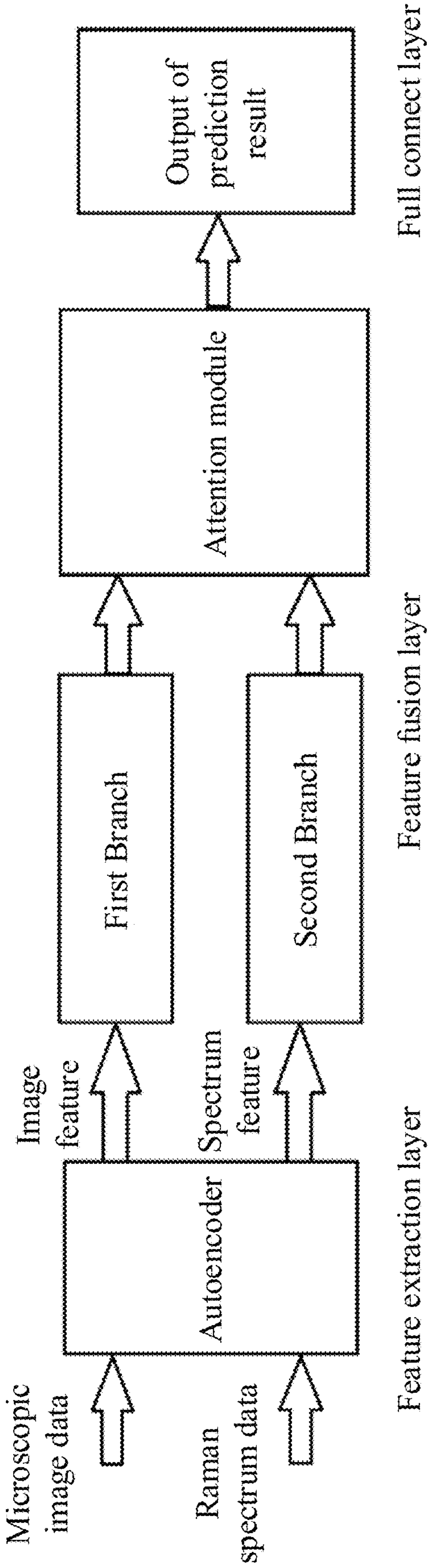
FIG. 3 shows a block diagram shows a dyeing effect prediction model according to an embodiment of the present disclosure.

In the embodiment of the present disclosure, as shown in FIG. 3, the Autoencoder is used as a feature extractor during the feature extraction. The Autoencoder is an unsupervised learning method that learns a compact representation from the input data and reconstructs the original data. To accommodate the multi-modal data, a Multi-modal Autoencoder can be constructed for the feature extraction of the Raman spectrum data and the microscopic image data, respectively. By using the Autoencoder, the model can automatically learn useful feature representations that are adaptive to different data without manually designing a feature extraction method.

The network structure of the Autoencoder can be composed of encoding layers and decoding layers. Different encoding and decoding modules, such as convolutional encoders and de-convolutional decoders, are used to better capture spatial features and context information of the spectrum data and the image data. In addition, a cross-modal connection can be added between the encoding layers, allowing the model to interact information between the spectrum data and the image data to further enhance feature learning capabilities.

The feature fusion layer is used to fuse features from two feature extraction networks. This can be achieved by a simple connecting operation or a more complex fusion layer. The fusion layer may be a fully connected layer, weighted fusion, or other fusion strategy to combine the features of the spectrum data and the image data.

According to the scheme of the embodiment of the disclosure, through multi-modal data fusion, information from different data sources can be comprehensively utilized so that the features related to the dyeing effect prediction task can be more comprehensively described, and the complementarity of various data sources can be fully utilized so that a more accurate and robust dyeing effect prediction result is provided.

In a possible implementation, step S1101 of determining the target image feature according to the microscopic image data of the to-be-detected yarn spindle by using the Multi-modal Autoencoder contained in the dyeing effect prediction model further includes:

determining a structural parameter of a crystalline structure according to the microscopic image data of the to-be-detected yarn spindle, wherein the structural parameter includes a crystallinity degree and/or an orientation degree; and determining the target image feature according to the microscopic image data and the structural parameter by using the Multi-modal Autoencoder contained in the dyeing effect prediction model.

In the embodiment of the present disclosure, a high-resolution microscope such as a transmission electron microscope or a scanning electron microscope may be used to image the measurement points of the to-be-detected yarn spindle. The microscope can provide high-resolution images to observe microstructure of the fibers. The distribution and orientation of the crystals can be visually observed from microscopic image data, and the crystallinity degree is determined by calculating an area occupied by the crystals (a ratio of the number of pixels in the crystal region to a total number of pixels). In the polyester fiber, polyester molecules can have a crystalline structure and an amorphous structure at the same time. A higher crystallinity degree indicates that more polymer molecules form ordered crystalline regions in the fiber. It is also possible to divide the image into a plurality of regions and perform crystallinity calculation for each region. By analyzing the crystallinity distribution of different regions, a frequency distribution map or histogram of the crystallinity can be obtained, thereby obtaining the crystallinity distribution information.

The orientation degree refers to an order degree of a direction of the polymer chains in the fiber. The orientation degree is obtained by counting an alignment direction of the polymer chains. For polyester fibers, the orientation degree is related to the tensile property, mechanical property, thermal property, transparency and the like of the fibers, and has a certain influence on the coloring effect of the fibers.

It should be noted that the crystallinity degree and the orientation degree are affected by the processes of spinning, drawing, and curing. During spinning, the orientation degree of the fibers may be influenced by factors such as spinning speed, spinning tension and spinning temperature. The temperature and speed in the drawing process and curing process also may affect the ordered arrangement of polymer chains within the fibers.

According to the scheme of the embodiment of the disclosure, the information on the crystallinity degree and the orientation degree can be extracted from the microscopic image data, so as to be combined with the spectrum data for use to improve the accuracy of the prediction result.

In a possible implementation, step S1102 of determining the target spectrum feature according to the first Raman data by using the Multi-modal Autoencoder, further includes:

determining the target spectrum feature according to at least one of Raman peak intensity information, peak position information, peak area information, or peak shape information contained in the first Raman data by using the Multi-modal Autoencoder of the dyeing effect prediction model.

In the embodiment of the present disclosure, the Raman spectrum can be used to analyze the crystallinity degree in fibrous materials. The molecular vibrational modes of the crystalline and amorphous regions produce different Raman scattering signals. By measuring the Raman spectrum of a sample and analyzing a specific Raman peak intensity or peak area, an index of crystallinity degree, such as a proportion of crystalline regions or a crystalline index, can be calculated.

Raman spectrum can also be used to analyze the orientation degree in fibrous materials. The orientation degree of the molecular chains of the fiber affects the features of its Raman spectrum. By measuring the Raman spectrum of the sample and analyzing information such as specific Raman peak intensity, peak position, or peak shape, information on the orientation degree of the fiber molecular chains can be obtained.

According to the scheme of the embodiment of the disclosure, the information on the crystallinity degree and the orientation degree can be extracted from the Raman spectrum data, so as to be combined with the microscopic image data for use to improve the accuracy of the prediction result.

In a possible implementation, step S1103 of determining the feature of the to-be-detected yarn spindle according to the target image feature and the target spectrum feature by using the feature fusion layer contained in the dyeing effect prediction model further includes:

- inputting the target image feature into a first branch of the feature fusion layer contained in the dyeing effect prediction model;
- inputting the target spectrum feature into a second branch of the feature fusion layer;
- determining a first weight corresponding to the first branch and a second weight corresponding to the second branch by using an attention module of the feature fusion layer; and
- determining the feature of the to-be-detected yarn spindle according to the target image feature, the first weight, the target spectrum feature and the second weight.

In the embodiment of the present disclosure, as shown in FIG. 3, an attention mechanism is adopted in the feature fusion layer to implement cross-modal feature fusion. The attention mechanism can automatically learn the feature importance of each modality and perform weighted fusion on the features of different modalities according to the importance. By introducing the attention mechanism, the model can be more flexibly combined with the features of different spectral data to improve the feature fusion effect.

The feature fusion layer can be composed of multiple branches, each of which is used to process the features of different modalities. In an example, a first branch is used to process image data and a second branch is used to process spectrum data. In each branch, the attention module performs importance assessment and weighting on the features. The weighted features are then fused to form the final multi-modal feature representation. The design of the feature fusion layer can be flexibly adjusted according to actual problems and characteristics of data set so as to obtain a better fusion effect.

Subsequent network structures in the dyeing effect prediction model receive the fused features output from the feature fusion layer, which may be a fully-connected neural network (DNN), a Recurrent Neural Network (RNN), or other network structures suitable for the prediction task. The prediction model outputs a dyeing label corresponding to a dyeing grade.

In summary, according to the scheme of the embodiment of the present disclosure, through the feature extraction network and the feature fusion layer, the dyeing effect prediction model with the multi-modal data fusion can more efficiently and accurately utilize the information of Raman spectrum data and image data, so as to obtain a stronger prediction capability.

Figure 2:
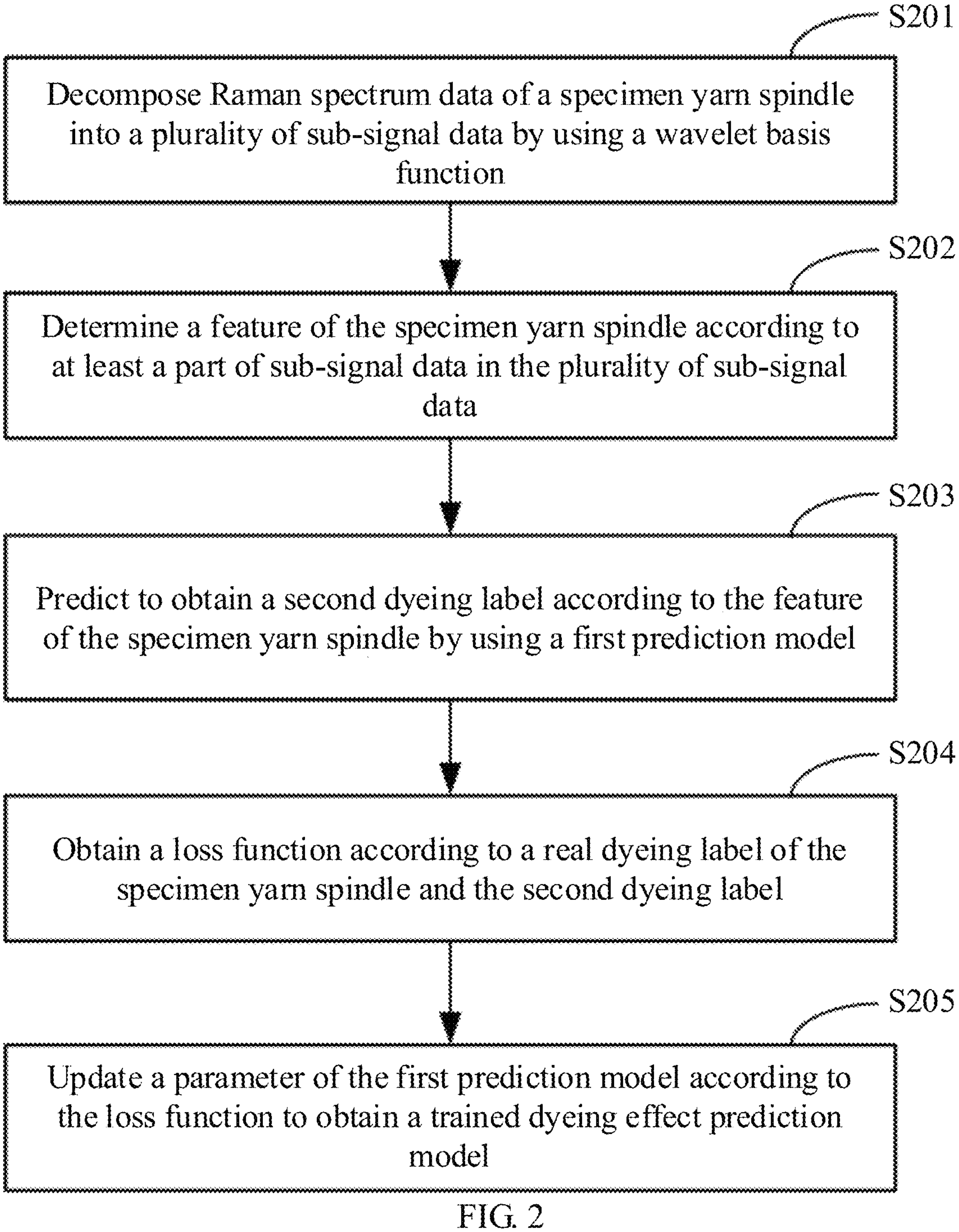
FIG. 2 shows a flow chart diagram of a training method of a dye effect prediction model according to an embodiment of the present disclosure.

FIG. 2 shows a flow chart diagram of a training method of the dye effect prediction model according to an embodiment of the present disclosure. As shown in FIG. 2, the method at least includes:

- S201, decomposing Raman spectrum data of a specimen yarn spindle into a plurality of sub-signal data by using a wavelet basis function;
- S202, determining a feature of the specimen yarn spindle according to at least a part of sub-signal data in the plurality of sub-signal data;
- S203, predicting to obtain a second dyeing label according to the feature of the specimen yarn spindle by using a first prediction model;
- S204, obtaining a loss function according to a real dyeing label of the specimen yarn spindle and the second dyeing label; and
- S205, updating a parameter of the first prediction model according to the loss function to obtain a trained dyeing effect prediction model.

In the embodiment of the present disclosure, the first prediction model may be an initial prediction model, or may be a prediction model that is updated by several rounds of training (i.e., several rounds of S201 to S205) from the initial prediction model.

In an example, a Convolutional Neural Network (CNN) can be used as an initial prediction model, the network containing three sets of convolutional and pooling layers to perform feature extraction on the input spectrum data. The convolutional layer may capture local features of the data, and the pooling layer serves to reduce dimensionality and computation of the data while preserving important features. A fully connected layer is added after the convolutional layer to further extract and learn global features. Finally, an output coded feature representation will be used for subsequent feature fusion and prediction tasks.

The use of labeled sample data is needed when the model is trained, and a corresponding real dyeing label is labeled for each sample according to the samples with known dyeing grades to become a target variable of the model. Model training is performed using the labeled sample data, and hyper-parameters of the model are adjusted to obtain optimal performance.

The second dyeing label is used for representing the dyeing effect grade, and the dyeing effect grade corresponding to the second dyeing label can adopt a division standard more fine than a real dyeing label. In the related art, the human eyes recognize the colors only into 5 grades, and each half grade in the 5 grades is regarded as a level (i.e., 9 levels in 5 grades). Due to the limitation of the ability to recognize with the naked eye, it is difficult to further divide the real labels into more fine grades. Therefore, when the Loss function is calculated, a Loss function suitable for fine-grained classification, such as Focal Loss, can be used to improve a distinguishing capability of the fine-grained grades. Meanwhile, through the multi-modal data fusion of Raman spectrum data and image data, the multi-modal data fusion can enhance the understanding and distinguishing capability of the model on fine-grained grades. Therefore, the second dyeing label can correspond to more dyeing effect grades (for example, 15 grades) to improve the prediction accuracy of the dyeing effect prediction model.

In the model training stage, an established model can be assessed by using methods such as cross validation and the like to measure prediction accuracy and generalization capability of the model. The performance of the model may be assessed with reference with evaluation metrics such as accuracy, precision, recall rate and F1 scores.

For a method and an example of performing wavelet transform by using wavelet basis functions, reference can be made to the related description of the corresponding steps in the foregoing embodiments of dyeing effect prediction method, and details thereof will not be repeated herein.

In a possible implementation, step S202 of determining the feature of the specimen yarn spindle according to at least the part of sub-signal data in the plurality of sub-signal data, further includes:

- selecting at least the part of sub-signal data from the plurality of sub-signal data according to a preset dimension or a preset frequency to obtain second Raman data, wherein the plurality of sub-signal data correspond to a plurality of wavelet coefficients with different dimensions or a plurality of spectrum components with different frequencies; and
- determining the feature of the specimen yarn spindle according to the second Raman data.

It should be noted that, during the dying prediction, the prediction model may need to make some changes according to different characteristics of the crystalline structure and the amorphous structure.

Selection of the feature extraction methods: since the fibers with crystalline and amorphous structures have different molecular arrangement and characteristics, the prediction model may need to select a suitable feature extraction method according to different structure types. For example, for the fibers with the crystalline structure, a feature extraction method that emphasizes the periodic arrangement of molecules may be selected, while for the fibers with the amorphous structure, a feature extraction method that emphasizes the disorder of molecules may be selected.

Data preprocessing: different data pre-processing steps may need to be performed for different configurations of fibers. For example, for the fibers with the crystalline structure, a calculation on the crystallinity degree may need to be performed, while for the fibers with the amorphous structure, information on how to handle disorder may need to be considered.

Adjustment of model structure: a structure of the prediction model may need to be adjusted for different structures of the fiber. For example, different sub-models can be designed for the crystalline and amorphous fibers separately and then integrated, or an attention mechanism can be used to dynamically adjust a degree of attention of the model for the different structures.

Data enhancement: in order to improve the robustness and generalization capability of the model, the data can be enhanced in the training stage, so that the model can be better adapted to the fibers with different structures. For example, the data may be transformed by rotating, flipping, scaling, etc., to allow the model to better learn features under different structures.

In a possible implementation, determining the feature of the specimen yarn spindle according to the second Raman data, includes:

- determining the feature of the specimen yarn spindle according to microscopic image data of the specimen yarn spindle and the second Raman data.

In a possible implementation, determining the feature of the specimen yarn spindle according to the microscopic image data of the specimen yarn spindle and the second Raman data, further includes:

- S2101, determining a specimen image feature according to the microscopic image data of the specimen yarn spindle by using a Multi-modal Autoencoder contained in the first prediction model;
- S2102, determining a specimen spectrum feature according to the second Raman data by using the Multi-modal Autoencoder; and
- S2103, determining the feature of the specimen yarn spindle according to the specimen image feature and the specimen spectrum feature by using a feature fusion layer contained in the first prediction model.

In a possible implementation, the step S2101 of determining the specimen image feature according to the microscopic image data of the specimen yarn spindle by using the Multi-modal Autoencoder contained in the first prediction model, further includes:

- determining a structural parameter of a crystalline structure according to the microscopic image data of the specimen yarn spindle, wherein the structural parameter includes a crystallinity degree and/or an orientation degree; and
- determining the specimen image feature according to the microscopic image data and the structural parameter by using the Multi-modal Autoencoder contained in the first prediction model.

In the embodiment of the present disclosure, when the specimen yarn spindle is a polymer fiber with a crystalline structure, a crystallinity degree, a crystallinity distribution, an orientation degree, and the like in the microscopic image data may be used as feature information. When the specimen yarn spindle is a polymer fiber with an amorphous structure, a ratio of amorphous regions, a distribution of amorphous regions, and a disorder degree of crystallinity in the microscopic image data may be used as feature information.

In a possible implementation, the step S2102 of determining the specimen spectrum feature according to the second Raman data by using the Multi-modal Autoencoder, further includes:

- determining the feature of the specimen yarn spindle according to at least one of Raman peak intensity information, peak position information, peak area information or peak shape information contained in the second Raman data by using the Multi-modal Autoencoder.

In a possible implementation, the step S2103 of determining the feature of the specimen yarn spindle according to the specimen image feature and the specimen spectrum feature by using the feature fusion layer contained in the first prediction model further includes:

- inputting the specimen image feature into a first branch of the feature fusion layer contained in the first prediction model;
- inputting the specimen spectrum feature into a second branch of the feature fusion layer;
- determining a first weight corresponding to the first branch and a second weight corresponding to the second branch by using an attention module of the feature fusion layer; and determining the feature of the specimen yarn spindle according to the specimen image feature, the first weight, the specimen spectrum feature and the second weight.

It should be noted that, the dyeing effect prediction model in the training stage is pre-trained by using multi-modal data, and weight values for the second Raman data and the microscopic image data in the feature extraction network and weight values for the multiple sub-signal data are preserved. Then, in the inference stage, only the Raman spectrum data is input into the feature extraction network to obtain feature representations, and then the features are used for dye effect prediction. In this way, the multi-modal data can be used for pre-training the feature extraction network to extract rich feature representations such that the model can better learn useful information in Raman spectrum data with the assistance of microscopic image data, obtaining a better prediction result in the inference stage. As such, it is possible to use only a small amount of microscopic image data in the model training stage and to use only the spectrum data in the inference prediction stage without using the microscopic image data, so that online detection is realized, the use cost is greatly reduced, and the industrial application capability is improved.

Figure 4:
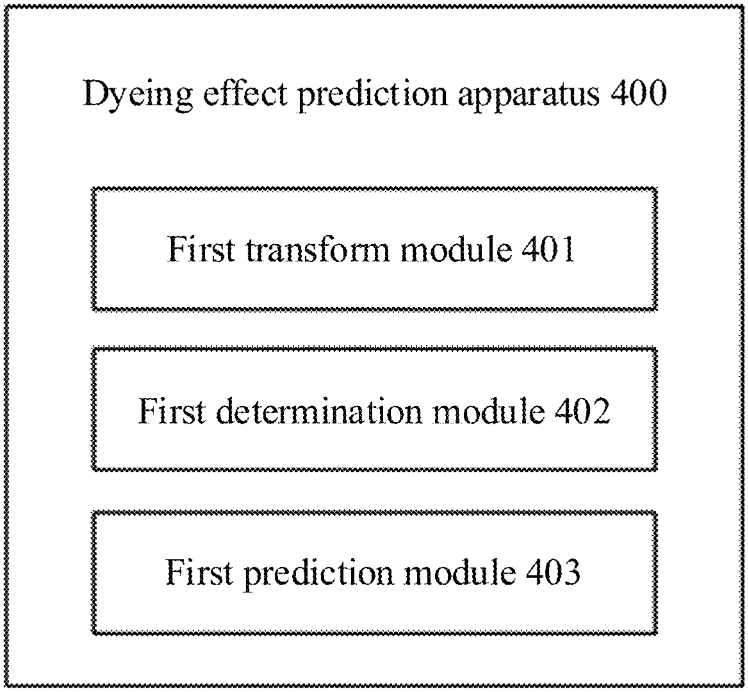
FIG. 4 shows a block diagram shows a dyeing effect prediction apparatus according to an embodiment of the present disclosure.

FIG. 4 is a dyeing effect prediction apparatus according to an embodiment of the present disclosure. As shown in FIG. 4, the apparatus includes:

a first transform module 401 configured to decompose Raman spectrum data of a to-be-detected yarn spindle into a plurality of sub-signal data by using a wavelet basis function;

a first determination module 402 configured to determine a feature of the to-be-detected yarn spindle according to at least a part of target sub-signal data in the plurality of sub-signal data; and a first prediction module 403 configured to predict to obtain a first dyeing label according to the feature of the to-be-detected yarn spindle by using a dyeing effect prediction model, wherein the first dyeing label is used for representing a dyeing effect grade.

In a possible implementation, the first determination module 402 includes:

a selection submodule configured to select at least the part of target sub-signal data from the plurality of sub-signal data according to a preset dimension or a preset frequency to obtain first Raman data, wherein the plurality of sub-signal data correspond to a plurality of wavelet coefficients with different dimensions or a plurality of spectrum components with different frequencies; and a feature determination submodule configured to determine the feature of the to-be-detected yarn spindle according to the first Raman data.

In a possible implementation, the feature determination submodule is configured to:

determine the feature of the to-be-detected yarn spindle according to microscopic image data of the to-be-detected yarn spindle and the first Raman data.

In a possible implementation, the feature determination submodule is configured to:

determine a target image feature according to the microscopic image data of the to-be-detected yarn spindle by using a Multi-modal Autoencoder contained in the dyeing effect prediction model;

determine a target spectrum feature according to the first Raman data by using the Multi-modal Autoencoder; and determine the feature of the to-be-detected yarn spindle according to the target image feature and the target spectrum feature by using a feature fusion layer contained in the dyeing effect prediction model.

In a possible implementation, the feature determination submodule is configured to:

determine a structural parameter of a crystalline structure according to the microscopic image data of the to-be-detected yarn spindle, wherein the structural parameter includes a crystallinity degree and/or an orientation degree; and determine the target image feature according to the microscopic image data and the structural parameter by using the Multi-modal Autoencoder contained in the dyeing effect prediction model.

In a possible implementation, the feature determination submodule is configured to:

determine the target spectrum feature according to at least one of Raman peak intensity information, peak position information, peak area information, or peak shape information contained in the first Raman data by using the Multi-modal Autoencoder of the dyeing effect prediction model.

In a possible implementation, the feature determination submodule is configured to:

input the target image feature into a first branch of the feature fusion layer contained in the dyeing effect prediction model;

input the target spectrum feature into a second branch of the feature fusion layer;

determine a first weight corresponding to the first branch and a second weight corresponding to the second branch by using an attention module of the feature fusion layer; and determine the feature of the to-be-detected yarn spindle according to the target image feature, the first weight, the target spectrum feature and the second weight.

For a description of specific functions and examples of each module and each submodule in the apparatus according to the embodiment of the present disclosure, reference can be made to the related description of the corresponding steps in the foregoing method embodiments, and details thereof will not be repeated herein.

Figure 5:
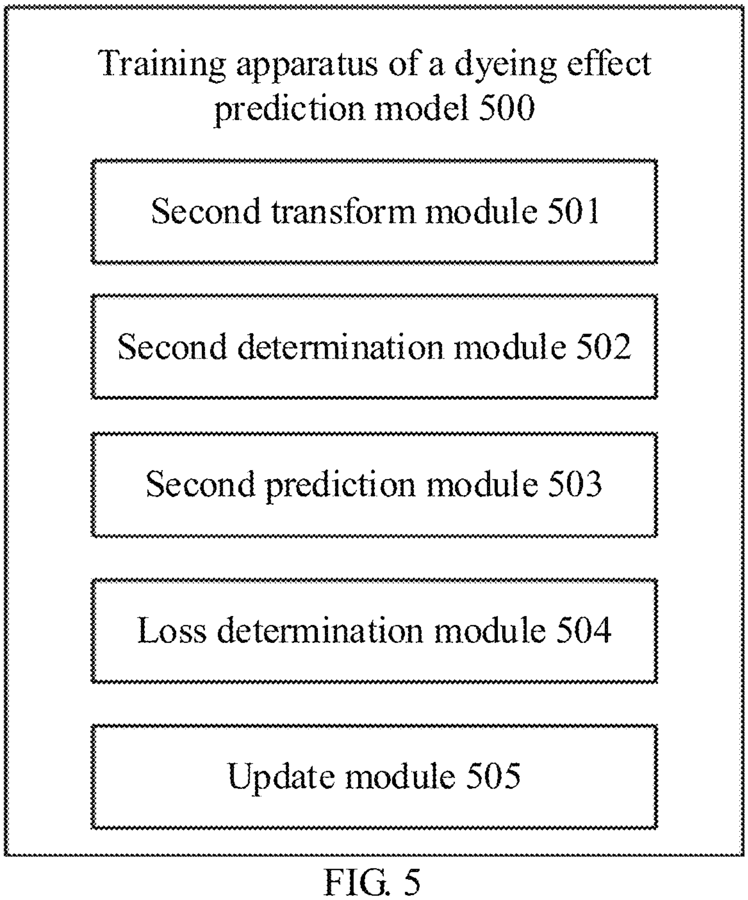
FIG. 5 shows a block diagram of a training apparatus of a dyeing effect prediction model according to an embodiment of the present disclosure.

FIG. 5 is a training apparatus of a dyeing effect prediction model according to an embodiment of the present disclosure. As shown in FIG. 5, the apparatus includes:

a second transform module 501 configured to decompose Raman spectrum data of a specimen yarn spindle into a plurality of sub-signal data by using a wavelet basis function;

a second determination module 502 configured to determine a feature of the specimen yarn spindle according to at least a part of sub-signal data in the plurality of sub-signal data;

a second prediction module 503 configured to predict to obtain a second dyeing label according to the feature of the specimen yarn spindle by using a first prediction model;

a loss determination module 504 configured to obtain a loss function according to a real dyeing label of the specimen yarn spindle and the second dyeing label; and an update module 505 configured to update a parameter of the first prediction model according to the loss function to obtain a trained dyeing effect prediction model.

In a possible implementation, the second determination module 502 includes:

a second selection submodule configured to select at least the part of sub-signal data from the plurality of sub-signal data according to a preset dimension or a preset frequency to obtain second Raman data, wherein the plurality of sub-signal data correspond to a plurality of wavelet coefficients with different dimensions or a plurality of spectrum components with different frequencies; and a second feature determination submodule configured to determine the feature of the specimen yarn spindle according to the second Raman data.

In a possible implementation, the second feature determination submodule is configured to:

determine the feature of the specimen yarn spindle according to the microscopic image data of the specimen yarn spindle and the second Raman data.

In a possible implementation, the second feature determination submodule is configured to:

determine a specimen image feature according to the microscopic image data of the specimen yarn spindle by using a Multi-modal Autoencoder contained in the first prediction model;

determine a specimen spectrum feature according to the second Raman data by using the Multi-modal Autoencoder; and determine the feature of the specimen yarn spindle according to the specimen image feature and the specimen spectrum feature by using a feature fusion layer contained in the first prediction model.

In a possible implementation, the second feature determination submodule is configured to:

determine a structural parameter of a crystalline structure according to the microscopic image data of the specimen yarn spindle, wherein the structural parameter includes a crystallinity degree and/or an orientation degree; and determine the specimen image feature according to the microscopic image data and the structural parameter by using the Multi-modal Autoencoder contained in the first prediction model.

In a possible implementation, the second feature determination submodule is configured to:

determine the feature of the specimen yarn spindle according to at least one of Raman peak intensity information, peak position information, peak area information or peak shape information contained in the second Raman data by using the Multi-modal Autoencoder.

In a possible implementation, the second feature determination submodule is configured to:

input the specimen image feature into a first branch of the feature fusion layer contained in the first prediction model;

input the specimen spectrum feature into a second branch of the feature fusion layer;

determine a first weight corresponding to the first branch and a second weight corresponding to the second branch by using an attention module of the feature fusion layer; and determine the feature of the specimen yarn spindle according to the specimen image feature, the first weight, the specimen spectrum feature and the second weight.

For a description of specific functions and examples of each module and each submodule of the apparatus according to the embodiment of the present disclosure, reference can be made to the related description of the corresponding steps in the foregoing method embodiments, and details thereof will not be repeated herein.

Figure 6:
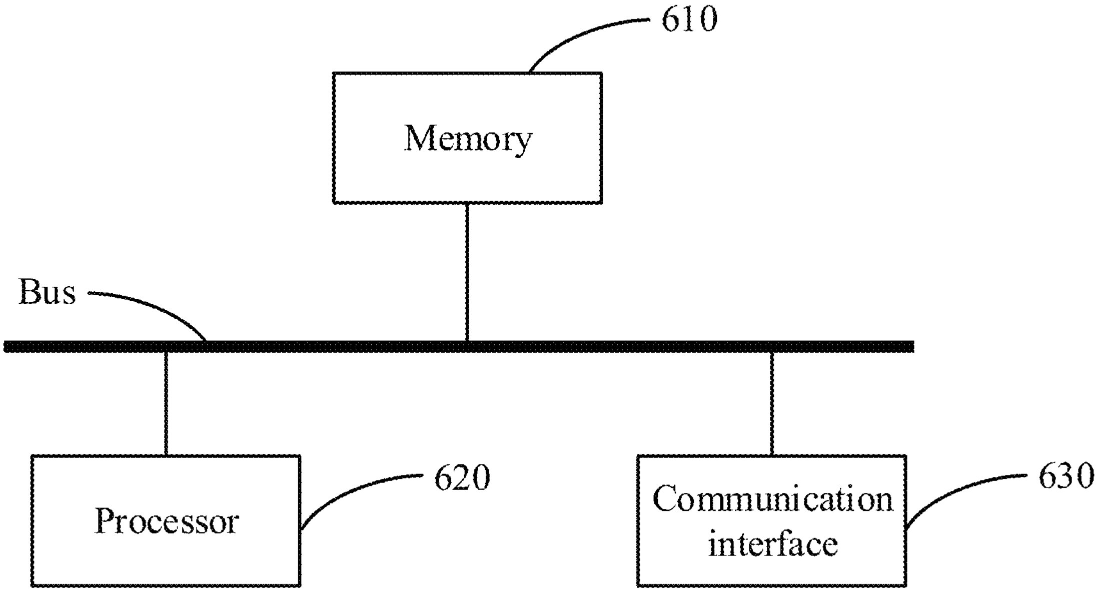
FIG. 6 shows a block diagram of an electronic device according to an embodiment of the disclosure.

FIG. 6 is a block diagram of an electronic device according to an embodiment of the present disclosure. As shown in FIG. 6, the electronic device includes: a memory 610 and a processor 620, the memory 610 storing therein a computer program operable on the processor 620. The number of the memory 610 and the processor 620 may be one or more. The memory 610 may store one or more computer programs that, when executed by the electronic device, cause the electronic device to perform the methods according to the above-described method embodiments. The electronic device may further include: the communication interface 630 is used for communicating with an external device to perform data interactive transmission.

If the memory 610, the processor 620, and the communication interface 630 are implemented independently, the memory 610, the processor 620, and the communication interface 630 may connect to and communicate with each other through a bus. The bus may be an Industry Standard Architecture (ISA) bus, a Peripheral Component Interconnect (PCI) bus, an Extended ISA (EISA) bus, or the like. The bus may be divided into an address bus, a data bus, a control bus, for example. For sake of illustration, the bus is represented by only one thick line in FIG. 6, but it does not mean only one bus or one type of bus is provided.

Optionally, in an implementation, if the memory 610, the processor 620, and the communication interface 630 are integrated on a chip, the memory 610, the processor 620, and the communication interface 630 may communicate with each other through an internal interface.

It should be understood that the processor may be a Central Processing Unit (CPU) or other general-purpose processor, a Digital Signal Processing (DSP), an Application Specific Integrated Circuit (ASIC), a Field Programmable Gate Array (FPGA) or other programmable logic device, discrete gate or transistor logic device or discrete hardware components, for example. The general-purpose processor may be a microprocessor or any conventional processor. It is noted that the processor may be a processor supporting Advanced RISC Machine (ARM) architecture.

Further, optionally, the memory may include a read-only memory and a random-access memory, and may further include a nonvolatile random-access memory. The memory may be a volatile memory or a nonvolatile memory, or may include both the volatile and the nonvolatile memory. The non-volatile memory may include a Read-Only Memory (ROM), a Programmable ROM (PROM), an Erasable PROM (EPROM), an Electrically EPROM (EEPROM), or a flash Memory. The volatile memory may include a Random-Access Memory (RAM), which acts as an external cache memory. By way of example and not limitation, many forms of RAM are available, such as Static RAM (SRAM), Dynamic Random-Access Memory (DRAM), Synchronous DRAM (SDRAM), Double Data Rate SDRAM (DDR SDRAM), Enhanced SDRAM (ESDRAM), Synchlink DRAM (SLDRAM), and Direct RAMBUS RAM (DR RAM).

The above embodiments may be implemented in whole or in part by software, hardware, firmware, or any combination thereof. When implemented in software, they may be implemented in whole or in part in the form of a computer program product. The computer program product includes one or more computer instruction. The computer instruction, when loaded and executed on a computer, can all or partially generate the flows or functions described in accordance with the embodiments of the disclosure. The computer may be a general-purpose computer, a special purpose computer, a network of computers, or other programmable devices. The computer instruction can be stored in a computer-readable storage medium or transmitted from one computer-readable storage medium to another computer-readable storage medium. For example, the computer instruction can be transmitted from one website, computer, server, or data center to another website, computer, server, or data center via wire (e.g., coaxial cable, fiber optic or Digital Subscriber Line (DSL)) or wireless (e.g., infrared, Bluetooth of microwave). The computer-readable storage medium can be any available medium that can be accessed by a computer or a data storage device, such as a server and a data center, that includes one or more available medium integration. The available medium may be a magnetic medium (e.g., floppy Disk, hard Disk, magnetic tape), an optical medium (e.g., Digital Versatile Disk (DVD)), or a semiconductor medium (e.g., Solid State Disk (SSD)), for example. It should be noted that the computer-readable storage medium referred to in the disclosure can be non-volatile storage medium, i.e., non-transitory storage medium.

It will be understood by those skilled in the art that all or part of the steps for performing the above embodiments may be implemented by hardware, or may be implemented by a program instructing relevant hardware, where the program may be stored in a computer-readable storage medium, and the storage medium may be a read-only memory, a magnetic disk or an optical disk.

In the description of the embodiments of the present disclosure, the description with reference to the terms such as "one embodiment", "some embodiments", "an example", "a specific example" or "some examples" means that a particular feature, structure, material, or characteristic described in connection with the embodiment or example is included in at least one embodiment or example of the present disclosure. Furthermore, the particular features, structures, materials, or characteristics described may be combined in any suitable manner in any one or more embodiments or examples. Moreover, various embodiments or examples and features in various embodiments or examples described in this specification can be combined and grouped by one skilled in the art if there is no mutual conflict.

In the description of the embodiments of the present disclosure, the sign "/" indicates a meaning of "or", for example, A/B indicates a meaning of A or B, unless otherwise specified. The term "and/or" herein is merely an association relationship describing associated objects, and means that there may be three relationships, for example, A and/or B may mean: A alone, both A and B, and B alone.

In the description of the embodiments of the present disclosure, the terms "first" and "second" are used for descriptive purposes only and should not be construed as indicating or implying relative importance or implicitly indicating the number of technical features as indicated. Thus, a feature defined as "first" or "second" may explicitly or implicitly include one or more features. In the description of the embodiments of the present disclosure, "a plurality" means two or more unless otherwise specified.

The above description is intended only to illustrate embodiments of the present disclosure, and should not be taken as limiting thereof, and any modifications, equivalents and improvements made within the spirit and principle of the present disclosure will fall within the scope of the present disclosure.

The invention claimed is:

1. A dyeing effect prediction method, comprising:

detecting a measurement point on a to-be-detected yarn spindle by using a Raman spectrometer, to obtain Raman spectrum data of the to-be-detected yarn spindle;

decomposing the Raman spectrum data of the to-be-detected yarn spindle into a plurality of sub-signal data by using a wavelet basis function;

determining a feature of the to-be-detected yarn spindle according to at least a part of target sub-signal data in the plurality of sub-signal data, comprising:

selecting at least the part of target sub-signal data from the plurality of sub-signal data according to a preset dimension or a preset frequency, to obtain first Raman data; wherein the plurality of sub-signal data correspond to a plurality of wavelet coefficients with different dimensions or a plurality of spectrum components with different frequencies;

determining a target image feature according to microscopic image data of the to-be-detected yarn spindle by using a Multi-modal Autoencoder contained in a dyeing effect prediction model;

determining a target spectrum feature according to the first Raman data by using the Multi-modal Autoencoder; and determining the feature of the to-be-detected yarn spindle according to the target image feature and the target spectrum feature by using a feature fusion layer contained in the dyeing effect prediction model; wherein the feature of the to-be-detected yarn spindle comprises at least one of a statistical feature of at least the part of target sub-signal data or a frequency domain feature of at least the part of target sub-signal data; and predicting to obtain a first dyeing label according to the feature of the to-be-detected yarn spindle by using the dyeing effect prediction model, wherein the first dyeing label is used for representing a dyeing effect grade, and the dyeing effect prediction model is obtained through training a first prediction model by using a feature of a specimen yarn spindle and a real dyeing label of the specimen yarn spindle;

wherein selecting at least the part of target sub-signal data from the plurality of sub-signal data. comprises:

selecting a wavelet dimension range according to characteristics of the plurality of sub-signal data:

extracting sub-signal data of a target frequency band in a wavelet coefficient image according to a selected wavelet dimension range;

performing an inverse wavelet transform on extracted sub-signal data, to convert the extracted sub-signal data back to an original spectrum data representation;

visualizing inversely transformed sub-signal data;

comparing similarity and difference of the inversely transformed sub-signal data with original spectrum data, to obtain a comparison result; and selecting at least the part of target sub-signal data according to the comparison result.

2. The method of claim 1, wherein the determining of the target image feature according to the microscopic image data of the to-be-detected yarn spindle by using the Multi-modal Autoencoder contained in the dyeing effect prediction model, comprises:

determining a structural parameter of a crystalline structure according to the microscopic image data of the to-be-detected yarn spindle, wherein the structural parameter includes a crystallinity degree and/or an orientation degree; and determining the target image feature according to the microscopic image data and the structural parameter by using the Multi-modal Autoencoder contained in the dyeing effect prediction model.

3. The method of claim 1, wherein the determining of the target spectrum feature according to the first Raman data by using the Multi-modal Autoencoder, comprises:

determining the target spectrum feature according to at least one of Raman peak intensity information, peak position information, peak area information, or peak shape information contained in the first Raman data by using the Multi-modal Autoencoder of the dyeing effect prediction model.

4. The method of claim 1, wherein the determining of the feature of the to-be-detected yarn spindle according to the target image feature and the target spectrum feature by using the feature fusion layer contained in the dyeing effect prediction model, comprises:

inputting the target image feature into a first branch of the feature fusion layer contained in the dyeing effect prediction model;

inputting the target spectrum feature into a second branch of the feature fusion layer;

determining a first weight corresponding to the first branch and a second weight corresponding to the second branch by using an attention module of the feature fusion layer; and determining the feature of the to-be-detected yarn spindle according to the target image feature, the first weight, the target spectrum feature and the second weight.

5. An electronic device, comprising:

at least one processor, and a memory connected in communication with the at least one processor;

wherein the memory stores an instruction executable by the at least one processor, and the instruction, when executed by the at least one processor, enables the at least one processor to execute the method of claim 1.

6. A non-transitory computer-readable storage medium storing a computer instruction thereon, wherein the computer instruction is used to cause a computer to execute the method of claim 1.

7. A training method of a dyeing effect prediction model, comprising:

decomposing Raman spectrum data of a specimen yarn spindle into a plurality of sub-signal data by using a wavelet basis function, wherein the Raman spectrum data of the specimen yarn spindle is obtained by detecting a measurement point on the specimen yarn spindle by using a Raman spectrometer;

determining a feature of the specimen yarn spindle according to at least a part of sub-signal data in the plurality of sub-signal data, comprising:

selecting at least the part of sub-signal data from the plurality of sub-signal data according to a preset dimension or a preset frequency to obtain second Raman data, wherein the plurality of sub-signal data correspond to a plurality of wavelet coefficients with different dimensions or a plurality of spectrum components with different frequencies;

determining a specimen image feature according to microscopic image data of the specimen yarn spindle by using a Multi-modal Autoencoder contained in a first prediction model;

determining a specimen spectrum feature according to the second Raman data by using the Multi-modal Autoencoder; and determining the feature of the specimen yarn spindle according to the specimen image feature and the specimen spectrum feature by using a feature fusion layer contained in the first prediction model; wherein the feature of the specimen yarn spindle comprises at least one of a statistical feature of at least the part of sub-signal data or a frequency domain feature of at least the part of sub-signal data;

predicting to obtain a second dyeing label according to the feature of the specimen yarn spindle by using the first prediction model;

obtaining a loss function according to a real dyeing label of the specimen yarn spindle and the second dyeing label; and updating a parameter of the first prediction model according to the loss function, to obtain the trained dyeing effect prediction model;

wherein selecting at least the part of sub-signal data from the plurality of sub-signal data, comprises:

selecting a wavelet dimension range according to characteristics of the plurality of sub-signal data;

extracting sub-signal data of a target frequency band in a wavelet coefficient image according to a selected wavelet dimension range;

performing an inverse wavelet transform on extracted sub-signal data, to convert the extracted sub-signal data back to an original spectrum data representation;

visualizing inversely transformed sub-signal data;

comparing similarity and difference of the inversely transformed sub-signal data with original spectrum data, to obtain a comparison result; and selecting at least the part of sub-signal data according to the comparison result.

8. The method of claim 7, wherein the determining of the specimen image feature according to the microscopic image data of the spectrum yarn spindle by using the Multi-modal Autoencoder contained in the first prediction model, comprises:

determining a structural parameter of a crystalline structure according to the microscopic image data of the specimen yarn spindle, wherein the structural parameter includes a crystallinity degree and/or an orientation degree; and determining the specimen image feature according to the microscopic image data and the structural parameter by using the Multi-modal Autoencoder contained in the first prediction model.

9. The method of claim 7, wherein the determining of the specimen spectrum feature according to the second Raman data by using the Multi-modal Autoencoder, comprises:

determining the feature of the specimen yarn spindle according to at least one of Raman peak intensity information, peak position information, peak area information or peak shape information contained in the second Raman data by using the Multi-modal Autoencoder.

10. The method of claim 7, wherein the determining of the feature of the specimen yarn spindle according to the specimen image feature and the specimen spectrum feature by using the feature fusion layer contained in the first prediction model, comprises:

inputting the specimen image feature into a first branch of the feature fusion layer contained in the first prediction model;

inputting the specimen spectrum feature into a second branch of the feature fusion layer;

determining a first weight corresponding to the first branch and a second weight corresponding to the second branch by using an attention module of the feature fusion layer; and determining the feature of the specimen yarn spindle according to the specimen image feature, the first weight, the specimen spectrum feature and the second weight.

11. An electronic device, comprising:

at least one processor; and a memory connected in communication with the at least one processor;

wherein the memory stores an instruction executable by the at least one processor, and the instruction, when executed by the at least one processor, enables the at least one processor to execute the method of claim 7.

12. A non-transitory computer-readable storage medium storing a computer instruction thereon, wherein the computer instruction is used to cause a computer to execute the method of claim 7.

* * * * *